(12) United States Patent
Yudanov

(10) Patent No.: US 11,643,998 B2
(45) Date of Patent: May 9, 2023

(54) FLOW CONTROL SYSTEM

(71) Applicant: Volvo Truck Corporation, Gothenburg (SE)

(72) Inventor: Sergi Yudanov, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 1 day.

(21) Appl. No.: 17/623,918

(22) PCT Filed: Jul. 2, 2019

(86) PCT No.: PCT/EP2019/067682
§ 371 (c)(1),
(2) Date: Dec. 30, 2021

(87) PCT Pub. No.: WO2021/001020
PCT Pub. Date: Jan. 7, 2021

(65) Prior Publication Data
US 2022/0364534 A1    Nov. 17, 2022

(51) Int. Cl.
*F02M 47/02* (2006.01)
*F02M 55/00* (2006.01)
*F02M 63/00* (2006.01)

(52) U.S. Cl.
CPC ........ *F02M 47/025* (2013.01); *F02M 55/008* (2013.01); *F02M 63/00* (2013.01)

(58) Field of Classification Search
CPC .... F02M 47/025; F02M 55/008; F02M 63/00; F02M 2200/28; F02M 47/022; F02M 55/002; F02M 63/0029; F02M 63/0045; F02M 47/027
See application file for complete search history.

(56) References Cited

FOREIGN PATENT DOCUMENTS

| EP | 1941154 A1 | 7/2008 | |
|---|---|---|---|
| EP | 2136070 A2 | 12/2009 | |
| WO | WO-2004003374 A1 * | 1/2004 | ........... F02M 45/086 |

(Continued)

OTHER PUBLICATIONS

International Search Report and Written Opinion of the International Searching Authority, PCT/EP2019/067682, dated Feb. 28, 2020, 8 pages.

(Continued)

*Primary Examiner* — Hung Q Nguyen
(74) *Attorney, Agent, or Firm* — Sage Patent Group

(57) ABSTRACT

A flow control system for a fuel injector of an internal combustion engine includes:
an inlet channel,
an outlet channel,
a return channel for returning pressurized fuel to a low-pressure system having a lower pressure than the inlet channel,
a fuel outlet chamber,
a moveable nozzle control member in the fuel outlet chamber for selectively allowing the pressurized fuel to flow into the outlet channel,
a biasing member biasing the nozzle control member towards a closed position,
a moveable member defining, with the nozzle control member, a fuel control chamber configured to bias the nozzle control member towards its closed position,
a moveable valve member for selectively opening and closing a flow passage and
a fuel connection between the inlet channel and the fuel control chamber for pressurizing the fuel control chamber.

17 Claims, 4 Drawing Sheets

(56) References Cited

FOREIGN PATENT DOCUMENTS

WO    WO-2007046733 A1 *  4/2007  ......... F02M 21/0239
WO       2014023317 A1    2/2014

OTHER PUBLICATIONS

International Preliminary Report on Patentability of the International Preliminary Examining Authority, PCT/EP2019/067682, dated May 20, 2021, 14 pages.

* cited by examiner

FLOW CONTROL SYSTEM

CROSS REFERENCE TO RELATED APPLICATIONS

This application is a 35 U.S.C. § 371 national stage application of PCT International Application No. PCT/EP2019/067682 filed on Jul. 2, 2019, the disclosure and content of which is incorporated by reference herein in its entirety.

TECHNICAL FIELD

The invention relates to a flow control system for a fuel injector of an internal combustion engine, to a fuel injector and/or to a vehicle.

The invention can be applied in heavy-duty vehicles, such as trucks, buses and construction equipment.

BACKGROUND

In fluid power applications, flow control systems are important constituents that directly define accuracy, reliability, efficiency and cost of the device/installation they belong to. Correspondingly, a flow control system must consume a minimum of energy to control the given fluid power, while being inexpensive, simple, reliable and durable and fulfilling the necessary control accuracy demands. One example of an especially demanding application for a flow control system is a diesel fuel injector. Another example of a demanding application for a flow control system is a DME (Dimethyl ether) diesel fuel injector. Contemporary diesel fuel injection systems of, for instance, a heavy-duty truck engine are required to deliver high hydraulic power in extraordinarily short bursts with an almost unthinkable accuracy: an instantaneous fluid power in the order of 40 kW can be routinely achieved, its delivery precisely controlled and then fully terminated, all within about 1 ms time slot or less. A fuel injector must keep doing this for up to a billion cycles safely and efficiently while retaining as good controllability as ever over its lifetime. At the same time, being a significant contributor to the overall cost of the engine, the fuel injector is receiving correspondingly high cost reduction attention. It must also be energy efficient, in order for the engine as a whole to attain good fuel economy, whilst affording sufficiently good controllability to allow efficient and clean combustion of the fuel.

According to its abstract, WO 2014/023317 A1 relates to a flow control system (1) for a fuel injector for an internal combustion engine comprising an inlet port (2), an outlet (3), a return port (4), a 2-way control valve (40) comprising a control valve member (6), a shuttle valve (43) and a main valve (44). The control valve (40) comprise a first seat (7), a first resilient means (16) configured to force said control valve member (6) towards the seat (7) so as to close the control valve (40), and a first abutment (8) that limits the lift of said control valve member (6) away from said first seat (7). The first seat (7) of the control valve (40) is slidably arranged in the shuttle control chamber (10). An end stop (20) for the first seat (7) is provided such that the pressure in a shuttle control chamber (10) tends to move said first seat (7) towards said end stop (20). The first seat (7), upon its mechanical contact with a valve member (6) is able to transmit at least a part of the force of the resilient means (16) onto a shuttle valve body (9) in the opening direction of the shuttle valve (43).

An aim of fuel injectors of engines where high injection pressure is required is to minimize internal leakage and to achieve shortened response times. These two requirements often conflict with each other. One way of solving this has been to use a 3-way control valve. However, a 3-way valve is relatively complex and requires expensive specialized equipment for its manufacture.

SUMMARY

In view of the above, an object of the invention is to provide a fuel control system for a fuel injector of an internal combustion engine which provides a good alternative to known designs and/or which at least in some aspect alleviates at least one of the drawbacks of the prior art. Another object of the invention is to provide a fuel control system for a fuel injector of an internal combustion engine which reduces internal leakage and/or shortens response times in a cost-efficient manner.

According to a first aspect of the invention, the object is achieved by a flow control system for a fuel injector of an internal combustion engine according to claim 1. According to a second aspect of the invention, the object is achieved by a fuel injector for an internal combustion engine according to claim 16. According to a third aspect of the invention, the object is achieved by a vehicle according to claim 17.

According to the first aspect thereof, the object is achieved by a flow control system for a fuel injector of an internal combustion engine, comprising:
an inlet channel for receiving a pressurized fuel,
an outlet channel for letting out the pressurized fuel,
a return channel for returning part of the pressurized fuel to a low-pressure system having a lower pressure than the pressurized fuel in the inlet channel when in use,
a fuel outlet chamber for receiving the pressurized fuel from the inlet channel,
a nozzle control member arranged in the fuel outlet chamber and configured to be moveable for selectively allowing the pressurized fuel to flow into the outlet channel,
a biasing member biasing the nozzle control member towards a closed position in which the pressurized fuel is prevented from being allowed into the outlet channel,
a moveable member, whereby at least the moveable member and the nozzle control member define a fuel control chamber, the fuel control chamber being configured such that a pressure therein biases the nozzle control member towards its closed position,
a valve member configured to be moveable for selectively opening and closing a flow passage between the fuel control chamber and the return channel, wherein the moveable member is configured to be moveable towards and away from the nozzle control member and to raise pressure in the fuel control chamber when moved towards the nozzle control member, and wherein the valve member is biased towards the moveable member for closing the flow passage and for moving the moveable member towards the nozzle control member, wherein the flow control system further comprises a fuel connection between the inlet channel and the fuel control chamber for pressurizing the fuel control chamber.

By the provision of the present invention, an efficient flow control system is provided in a simpler and thereby also a more cost-efficient manner. Especially, the system has shown to provide efficient fuel injections with minimized internal fuel leakage and with shortened response times in a cost-efficient manner. This is for example provided by having a moveable member configured to be moveable in the fuel control chamber and to cooperate with the valve member and the nozzle control member as disclosed herein.

The present invention may be used in fuel injectors working with various types of fuels, such as diesel and highly volatile fuels, such as the aforementioned DME fuel.

Optionally, the flow control system may be configured such that when the nozzle control member is moved towards an open position in which the pressurized fuel is being allowed into the outlet channel, a portion of the nozzle control member reduces a flow area between the fuel control chamber and the flow passage. Fuel leakage from the inlet channel to the return channel can thereby be limited when the nozzle control member is moved towards the open position and when it is in the fully open position.

Preferably, the fuel connection may comprise a hydraulic restrictor for restricting the flow of pressurized fuel from the inlet channel to the fuel control chamber. This configuration may facilitate that the pressure in the fuel control chamber drops to a level so that a positive pressure difference between the fuel outlet chamber and the fuel control chamber is provided when the flow passage is opened by the valve member. The positive pressure difference may then overcome a force from the biasing member so that the nozzle control member opens the connection between the fuel outlet chamber and the outlet channel.

Optionally, the nozzle control member and the moveable member may be directly facing each other in the fuel control chamber. Hence, there is no additional member, element or the like in-between the nozzle control member and the moveable member in the fuel control chamber. Still optionally, the fuel control chamber may be configured such that a pressure therein directly biases the nozzle control member towards its closed position. The expression "directly biases" as used herein with respect to the fuel control chamber means that there is no additional member, element or the like in-between the moveable member and the nozzle control member.

Optionally, the nozzle control member and the moveable member may be coaxially arranged. Preferably, the nozzle control member and the moveable member are arranged, e.g. coaxially arranged, in a cylindrical guide. In the cylindrical guide the members may be closely matched to its diameter so as to limit fluid leakage that may occur along the guide, which is dependent on the clearance between the guide and the guided members and on the pressure differences existing along the guide.

Optionally, the nozzle control member and the moveable member may be arranged in a guide, as mentioned in the above, whereby the nozzle control member and the moveable member are configured to be moveable to a position where they contact each other such that a flow area of the flow passage is minimized. Fuel leakage from the inlet channel to the return channel can thereby be limited when the valve member is in a position where the flow passage is open with respect to the return channel.

Optionally, the flow passage may be provided in the moveable member. This may result in a more simplified configuration and hence a more cost-efficient configuration. Still optionally, the moveable member may be in the form of a piston.

Optionally, the flow control system may further comprise a first abutment surface, whereby the moveable member is configured to be moved towards the first abutment surface and to contact the first abutment surface by a pressure rise in the fuel control chamber. The first abutment surface may for example be provided in the aforementioned guide. Still further, the first abutment surface and the moveable member may further be configured such that fuel leakage is minimized or prevented between the contacting surfaces of the first abutment surface and the moveable member. Thus, and still optionally, the nozzle control member and the moveable member may be arranged in a guide, as mentioned in the above, wherein the first abutment surface may act as a valve seat when in contact with the moveable member, preventing a leakage of fuel from the fuel control chamber past the guide and out to the return channel. Still optionally, the flow control system may be configured so that when the moveable member and/or the nozzle control member are moved towards each other, the flow area between the fuel control chamber and the flow passage may be reduced, and thereby leakage from the fuel control chamber to the return channel may be reduced.

Optionally, the valve member may be part of an electronically controlled valve.

Optionally, the biasing member may be a first resilient member. Still optionally, the first resilient member may be provided in the fuel outlet chamber and abut a second abutment surface provided in the fuel outlet chamber.

Optionally, the flow control system may further comprise a second resilient member which biases the valve member towards the moveable member.

Optionally, the outlet channel may be connected to a fuel injector nozzle.

Optionally, the outlet channel may be connected to a spill valve for venting off high pressure in the outlet channel between consecutive fuel injections from the fuel injector.

According to the second aspect thereof, the object is achieved by a fuel injector for an internal combustion engine comprising the flow control system according to any one of the embodiments of the first aspect of the invention. According to the third aspect thereof, the object is achieved by a vehicle comprising the flow control system according to any one of the embodiments of the first aspect of the invention.

Advantages and effects provided by the second and third aspects of the invention are largely analogous to the advantages and effects as provided by the flow control system according to the embodiments of the first aspect of the invention. It shall also be noted that all embodiments of the second and third aspects of the invention are applicable to and combinable with all embodiments of the first aspect of the invention and vice versa.

BRIEF DESCRIPTION OF THE DRAWINGS

With reference to the appended drawings, below follows a more detailed description of embodiments of the invention cited as examples.

In the drawings.

Figure 1:
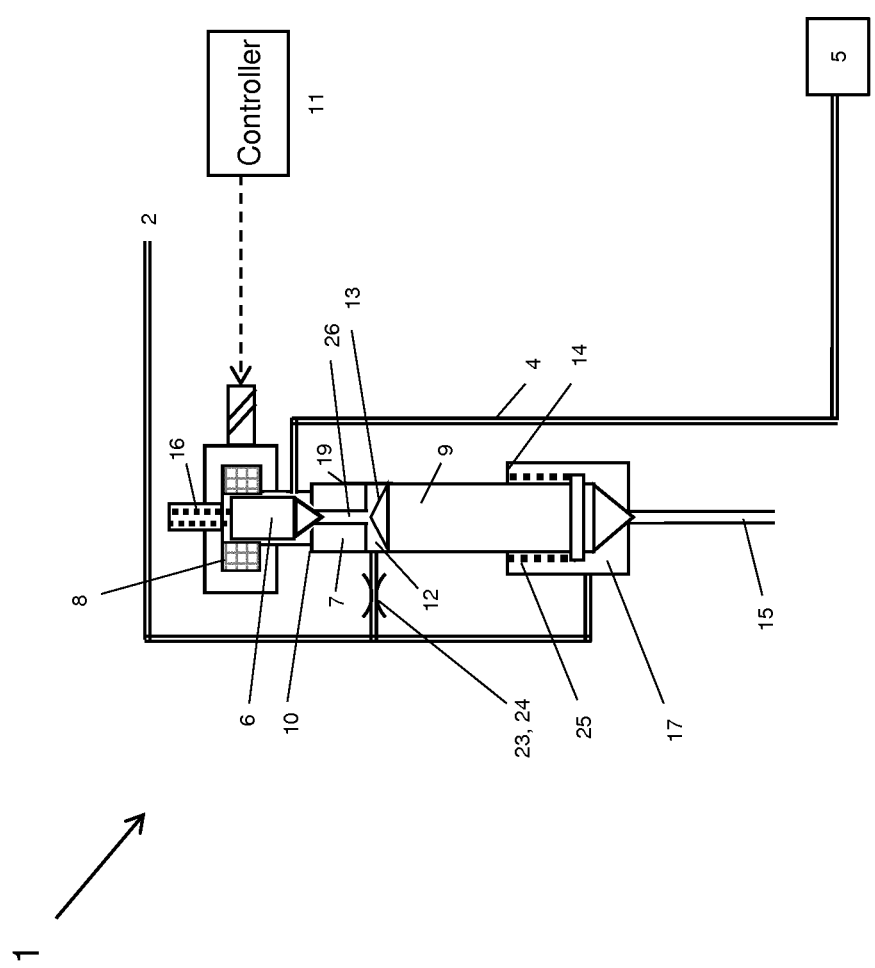
FIGS. 1-3 show a flow control system according to an embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like

DETAILED DESCRIPTION OF EXAMPLE EMBODIMENTS OF THE INVENTION

Embodiments of the present invention will now be described with respect to FIGS. 1-4 which show schematic sectional views of a flow control system 1. The flow control system 1 may be, or may be part of, a fuel injector for an internal combustion engine (not shown). The internal combustion engine may be part of a vehicle (not shown), such as a truck, a bus, a passenger car and a construction equipment vehicle.

With reference to e.g. FIG. 1, a flow control system 1 for a fuel injector of an internal combustion engine is shown. The system 1 comprises an inlet channel 2 for receiving a pressurized fuel. The pressurized fuel may for example be pressurized by a high pressure pump (not shown) which is fluidly connected to a fuel tank (not shown). The pressurized fuel in the inlet channel 2 may for example have a pressure of 150-3000 bar.

The flow control system 1 further comprises an outlet channel 15 for letting out the pressurized fuel and a return channel 4 for returning part of the pressurized fuel to a low-pressure system 5 having a lower pressure than the pressurized fuel in the inlet channel 2 when the flow control system 1 is in use. The low-pressure system 5 may for example be the earlier mentioned fuel tank.

The flow control system 1 further comprises a fuel outlet chamber 17 for receiving the pressurized fuel from the inlet channel 2 and a nozzle control member 9 arranged in the fuel outlet chamber 17. The nozzle control member 9 is configured to be moveable for selectively allowing the pressurized fuel to flow into the outlet channel 15.

The flow control system 1 further comprises a biasing member 25 which biases the nozzle control member 9 towards a closed position in which the pressurized fuel is prevented from being allowed into the outlet channel 15. The biasing member 25 is here a first resilient member in the form of a spring, e.g. a coil spring, provided in the fuel outlet chamber 17. The spring 25 abuts a second abutment surface 14 provided in the fuel outlet chamber 17.

The flow control system 1 further comprises a moveable member 7, whereby at least the moveable member 7 and the nozzle control member 9 define a fuel control chamber 12, wherein the fuel control chamber 12 is configured such that a pressure therein biases the nozzle control member 9 towards its closed position. The moveable member 7 may for example be a piston member which is moveable, e.g. slidable, in a guide 19 of the flow control system 1. The guide 19 may for example be cylindrically formed, and arranged to accommodate at least the moveable member 7 and the nozzle control member 9, which preferably are coaxially arranged in the guide 19. The members 9 and 7 are closely matched to its diameter in the guide 19 so as to limit fluid leakage that may occur along the guide 19, which is dependent on the clearance between the guide 19 and the guided members 9 and 7 and on the pressure differences existing along the guide 19.

The flow control system 1 further comprises a valve member 6 configured to be moveable for selectively opening and closing a flow passage 26 between the fuel control chamber 12 and the return channel 4, wherein the moveable member 7 is configured to be moveable towards and away from the nozzle control member 9 and to raise pressure in the fuel control chamber 12 when moved towards the nozzle control member 9. Further, the valve member 6 is biased towards the moveable member 7 for closing the flow passage 26 and for moving the moveable member 7 towards the nozzle control member 9. The flow control system 1 further comprises a fuel connection 23 between the inlet channel 2 and the fuel control chamber 12 for pressurizing the fuel control chamber 12. The fuel connection 23 preferably comprises a hydraulic restrictor 24 for restricting the flow of pressurized fuel from the inlet channel 2 to the fuel control chamber 12. The flow passage 26 is in the shown embodiment provided in the moveable member 7. More particularly, the flow passage 26 is here provided as a centrally placed bore in the moveable member 7 which extends in the longitudinal direction relative to the cylindrically formed guide 19.

The valve member 6 is biased towards the moveable member 7 by a second resilient member 16. The second resilient member 16 is here in the form of a coil spring. The valve member 6 and the second resilient member 16 are here part of a valve 8, which preferably is an electronically controlled valve such as a solenoid valve, controlled by a controller 11.

Still further, the flow control system 1 comprises a first abutment surface 10, whereby the moveable member 7 is configured to be moved towards the first abutment surface 10 and to contact the first abutment surface 10 by a pressure rise in the fuel control chamber 12. Moreover, the first abutment surface 10 and the moveable member 7 are configured such that fuel leakage is minimized or prevented between the contacting surfaces of the first abutment 10 surface and the moveable member 7. Thus, the first abutment surface 10 may act as a valve seat when in contact with the moveable member 7, preventing a leakage of fuel from the fuel control chamber 12 past the guide 19 and out to the return channel 4. Furthermore, the flow control system 1 is also configured so that when the moveable member 7 and/or the nozzle control member 9 are moved towards each other, a flow area between the fuel control chamber 12 and the flow passage 26 may be reduced, and thereby leakage from the fuel control chamber 12 to the return channel 4 may be reduced.

For example, when the nozzle control member 9 is moved towards an open position in which the pressurized fuel is being allowed into the outlet channel 15, a portion 13 of the nozzle control member 9 reduces the flow area between the fuel control chamber 12 and the flow passage 26. Fuel leakage from the inlet channel 2 to the return channel 4 can thereby be limited when the nozzle control member 9 is moved towards the open position and when it is in the fully open position. The portion 13 is in the shown embodiment cone-shaped and protrudes towards the moveable member 7 so that the apex of the cone will be received in the flow passage 26 when the nozzle control member 9 and the moveable member 7 are moved towards each other. This may lead to that the flow area between the fuel control chamber 12 and the flow passage 26 is hydraulically blocked when the members 7, 9 contact each other.

Now, with respect to FIGS. 1-3, an opening and closing sequence of the flow control system 1 will be described. In a non-injecting state, represented by FIG. 1, the solenoid valve 8 is not energized and the valve member 6 is pushed by the spring 16 so that it is in contact with the moveable member 7. This provides that the flow passage 26 is blocked and thereby the pressure in the fuel control chamber 12 equals the inlet pressure in the inlet channel 2. The moveable member 7 is also pushed by the pressure in the fuel control chamber 12 against the abutment surface 10, and the nozzle control member 9 is pushed by the pressure in the fuel control chamber 12 into its closed position where the hydraulic connection between the fuel outlet chamber 17 and the outlet channel 15 is closed.

To initiate injection, the solenoid valve 8 is energized, which is controlled by the controller 11, and thereby the valve member 6 is attracted against the force of the spring 16. This opens the connection between the fuel control chamber 12 and the return channel 4, see FIG. 2. The flow area of the flow passage 26, which is opened by the valve member 6, is configured to be sufficiently big to drop the pressure in the fuel control chamber 12. This may also be facilitated by use of the hydraulic restrictor 24 provided in the fuel connection 23, which restrictor 24 is configured to feed the fuel control chamber 12 with fuel with a predetermined feeding rate. This causes a positive pressure difference between the fuel outlet chamber 17 and the fuel control chamber 12, and the flow control system 1 is adapted so that the positive pressure difference overcomes the force of the biasing member 25. This leads to that the nozzle control member 9 is moved from its closed position to an open position where the connection between the fuel outlet chamber 17 and the outlet channel 15 is opened. This causes fuel to flow from the inlet channel 2 to the outlet channel 15.

When the nozzle control member 9 moves upwards in the guide 19 towards the moveable member 7, the flow area between the fuel control chamber 12 and the flow passage 26 becomes restricted. This limits the flow of fuel from the inlet channel 2 via the fuel connection 23 and the fuel control chamber 12 out to the return channel 4, and thus limits control leakage of the flow control system 1. This state is shown in FIG. 2.

Figure 3:
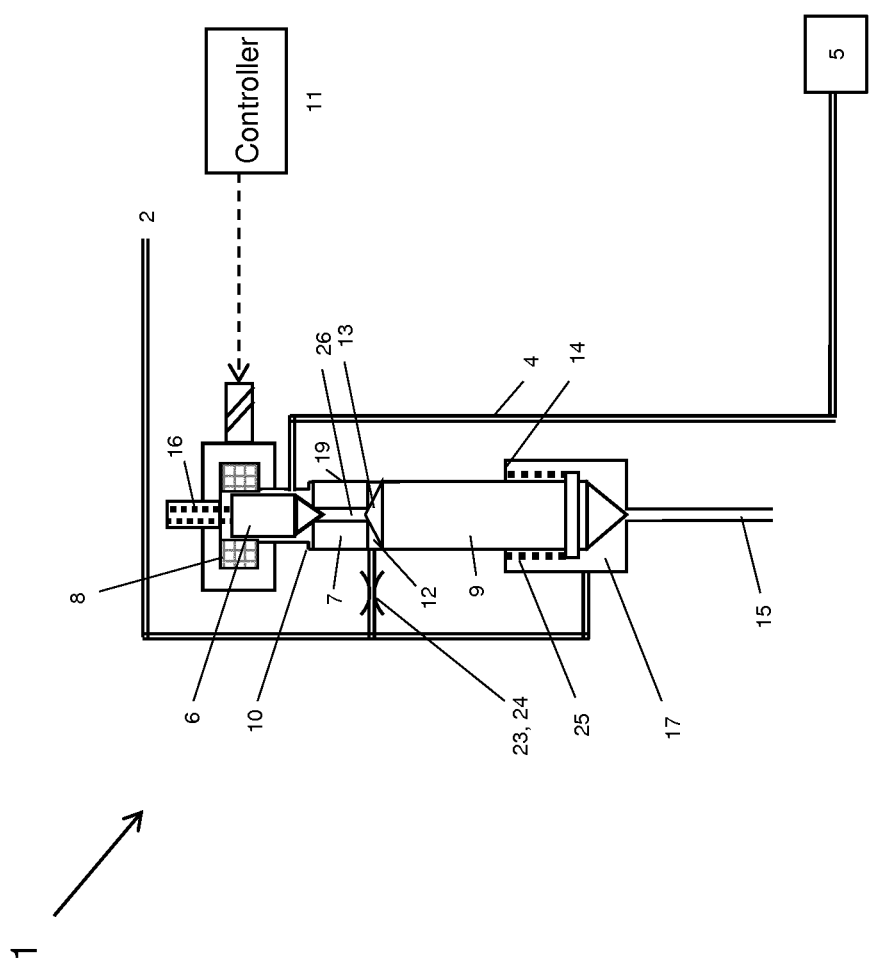

To stop an injection, the solenoid valve 8 is de-energized, resulting in that the spring 16 makes the valve member 6 close the connection between the flow passage 26 and the return channel 4, see FIG. 3. This raises the pressure in the fuel control chamber 12. The pressure rise may happen relatively slowly by use of the hydraulic restrictor 24. However, by the configuration of the flow control system 1, and especially by use of the moveable member 7, the response time may be improved. More particularly, the force of the spring 16 acting on the valve member 6 is transferred to the moveable member 7 when the valve member 6 and the moveable member 7 contact each other. Thereby the moveable member 7 is moved from its abutment surface 10 towards the nozzle control member 9, resulting in an extra pressure increase in the fuel control chamber 12. This shortens the time it takes for the nozzle control member 9 to begin its movement towards its closed position where the connection between the fuel outlet chamber 17 and the outlet channel is closed. The closer the nozzle control member 9 is to its fully closed position, the bigger the throttling effect it creates resulting in a pressure reduction in the outlet channel 15. Since the pressure in the outlet channel 15 also acts on the nozzle control member 9 in the direction of its opening, the increasing throttling effect accelerates the closure of the nozzle control member 9. Thus, the closing is accomplished by the throttling effect and by the spring 25, while the pressure rise in the fuel control chamber 12 moves the moveable member 7 back to the abutment surface 10. Then the system 1 is brought back to its initial position as shown in FIG. 1, ready for the next injection cycle.

Figure 2:
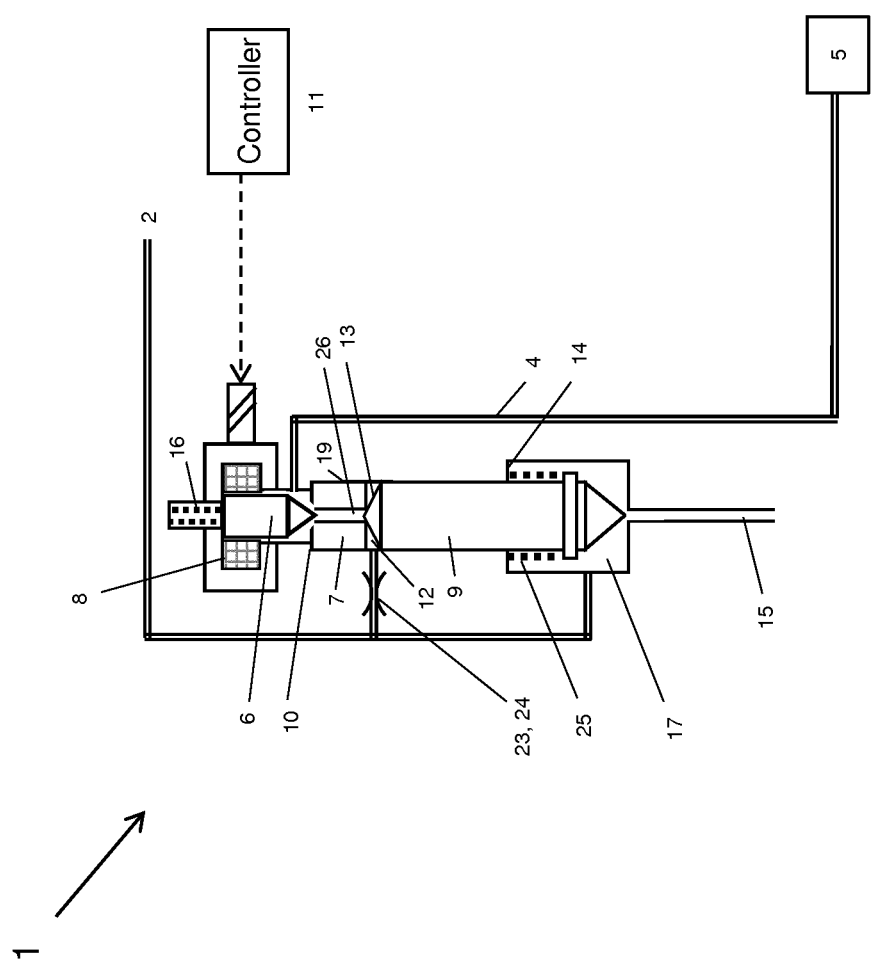

The flow control system 1 may function as a fuel injector with the configuration as shown in e.g. FIGS. 1-3. For example, this configuration may be beneficially used for fuels such as diesel. However, the flow control system 1 has also shown to be useful for other fuels, such as highly volatile fuels with very low viscosity and poor lubricity, e.g. DME fuel as mentioned in the above.

Figure 4:
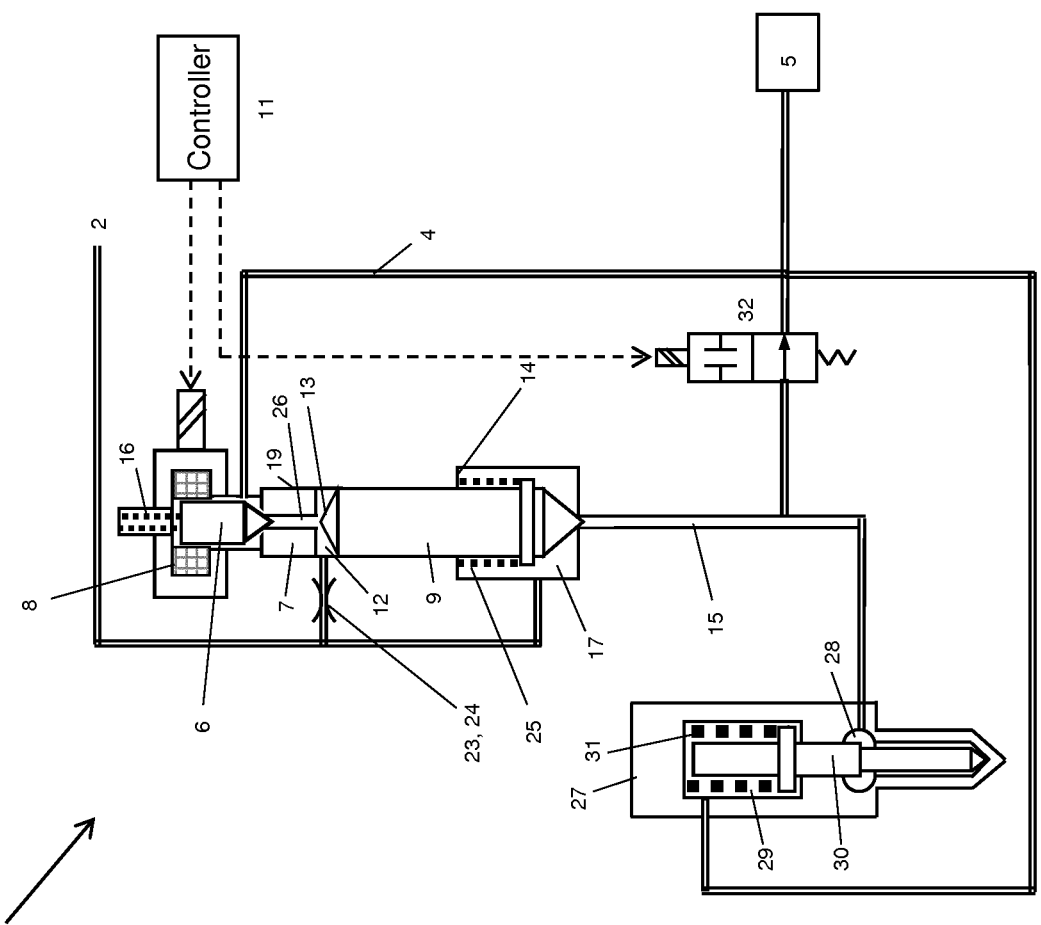
FIG. 4 shows the flow control system connected to a fuel injector nozzle according to an example embodiment of the present invention.

FIG. 4 shows an alternative embodiment of the invention which may be used for such highly volatile fuels. In this embodiment, the nozzle control member 9 may function as a shut-off valve member that controls admission of pressurized fuel to a spring-closed fuel injector nozzle 27. The spring-closed fuel injector nozzle 27 comprises a third resilient member 31, in the form of a spring, which is provided in a chamber 29, whereby the spring 31 biases a nozzle member 30 towards a closed position where a nozzle outlet chamber 28 is closed. The system 1 further comprises a spill valve 32 which fluidly connects the outlet channel 15 to the low-pressure system 5. The nozzle outlet chamber 28 can then be vented of high pressure between consecutive injections by means of the spill valve 32, thereby limiting fuel leakage via the closed nozzle member 30 in case nozzle 27 suffers damage or wear leading to its inability to seal against high fuel pressure in the closed position.

It is to be understood that the present invention is not limited to the embodiments described above and illustrated in the drawings; rather, the skilled person will recognize that many changes and modifications may be made within the scope of the appended claims.

The invention claimed is:

1. A flow control system for a fuel injector of an internal combustion engine, comprising:
   an inlet channel for receiving a pressurized fuel,
   an outlet channel for letting out the pressurized fuel,
   a return channel for returning part of the pressurized fuel to a low-pressure system having a lower pressure than the pressurized fuel in the inlet channel when in use,
   a fuel outlet chamber for receiving the pressurized fluid from the inlet channel,
   a nozzle control member arranged in the fuel outlet chamber and configured to be moveable for selectively allowing the pressurized fuel to flow into the outlet channel,
   a biasing member biasing the nozzle control member towards a closed position in which the pressurized fuel is prevented from being allowed into the outlet channel,
   a moveable member, whereby at least the moveable member and the nozzle control member define a fuel control chamber, the fuel control chamber being configured such that a pressure therein biases the nozzle control member towards its closed position,
   a valve member configured to be moveable for selectively opening and closing a flow passage between the fuel control chamber and the return channel, wherein the moveable member is configured to be moveable towards and away from the nozzle control member and to raise pressure in the fuel control chamber when moved towards the nozzle control member, and wherein the valve member is biased towards the moveable member for closing the flow passage and for moving the moveable member towards the nozzle control member, wherein the flow control system further comprises a fuel connection between the inlet channel and the fuel control chamber for pressurizing the fuel control chamber.

2. The flow control system according to claim 1, wherein the flow control system is configured such that when the nozzle control member is moved towards an open position in which the pressurized fuel is being allowed into the outlet channel, a portion of the nozzle control member reduces a flow area between the fuel control chamber and the flow passage.

3. The flow control system according to claim 1, wherein the fuel connection comprises a hydraulic restrictor for restricting the flow of pressurized fuel from the inlet channel to the fuel control chamber.

4. The flow control system according to claim 1, wherein the nozzle control member and the moveable member are directly facing each other in the fuel control chamber.

5. The flow control system according to claim 1, wherein the nozzle control member and the moveable member are coaxially arranged.

6. The flow control system according to claim 1, wherein the nozzle control member and the moveable member are arranged in a guide, whereby the nozzle control member and the moveable member are configured to be moveable to a position where they contact each other such that a flow area of the flow passage is minimized.

7. The flow control system according to claim 1, wherein the flow passage is provided in the moveable member.

8. The flow control system according to claim 1, further comprising a first abutment surface, whereby the moveable member is configured to be moved towards the first abutment surface and to contact the first abutment surface by a pressure rise in the fuel control chamber.

9. The flow control system according to claim 8, wherein the nozzle control member and the moveable member are arranged in a guide, and wherein the first abutment surface acts as a valve seat when in contact with the moveable member, preventing a leakage of fuel from the fuel control chamber past the guide and out to the return channel.

10. The flow control system according to claim 8, configured so that when the moveable member and/or the nozzle control member are moved towards each other, a flow area between the fuel control chamber and the flow passage is reduced.

11. The flow control system according to claim 1, wherein the valve member is part of an electronically controlled valve.

12. The flow control system according to claim 1, wherein the biasing member is a first resilient member and is provided in the fuel outlet chamber and abuts a second abutment surface provided in the fuel outlet chamber.

13. The flow control system according to claim 1, further comprising a second resilient member which biases the valve member towards the moveable member.

14. The flow control system according to claim 1, wherein the outlet channel is connected to a fuel injector nozzle.

15. The flow control system according to claim 1, wherein the outlet channel is connected to a spill valve for venting off high pressure in the outlet channel between consecutive fuel injections from the fuel injector.

16. A fuel injector for an internal combustion engine comprising the flow control system according to claim 1.

17. A vehicle comprising the flow control system of claim 1.

* * * * *